March 18, 1924.
A. H. HARRIS
1,486,959
COLLAPSIBLE TIRE CORE
Filed Nov. 28, 1922    2 Sheets-Sheet 1
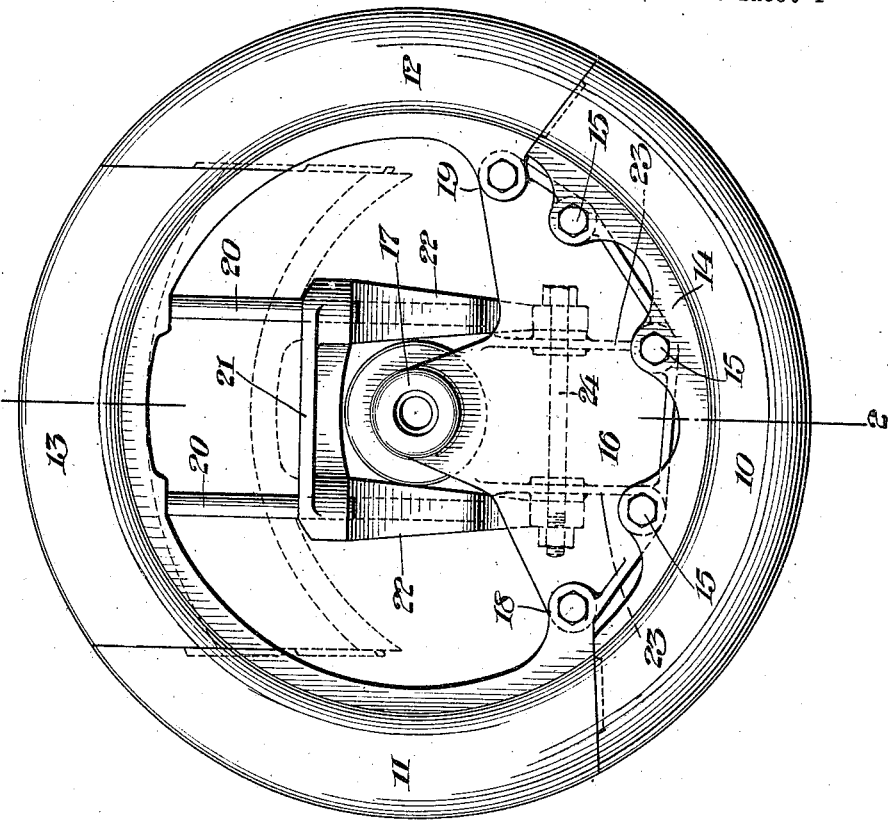
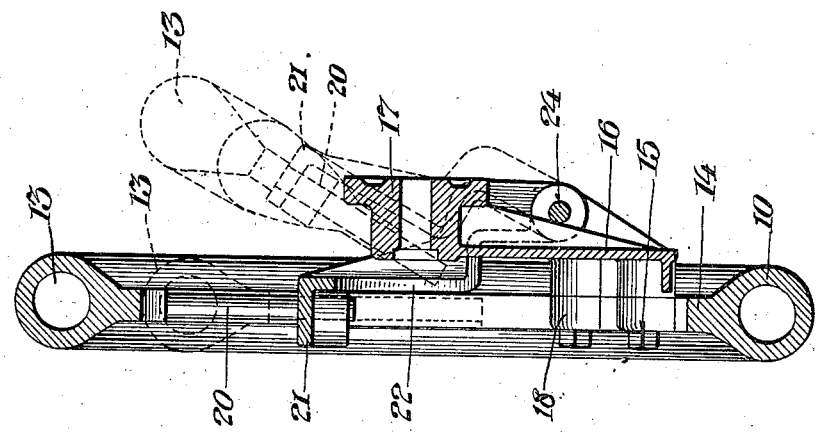
Inventor
Archer H. Harris
by his Attorney
John R. Nolan March 18, 1924.  
A. H. HARRIS  
COLLAPSIBLE TIRE CORE  
Filed Nov. 28, 1922

Inventor  
Archer H. Harris  
by his Attorney  
John R. Nolan

Patented Mar. 18, 1924.

1,486,959

UNITED STATES PATENT OFFICE.

ARCHER H. HARRIS, OF BARBERTON, OHIO.

COLLAPSIBLE TIRE CORE.

Application filed November 28, 1922. Serial No. 603,744.

*To all whom it may concern:*

Be it known that I, ARCHER H. HARRIS, a citizen of the United States, and resident of Barberton, in the county of Summit and State of Ohio, have invented certain new and useful Improvements in Collapsible Tire Cores, of which the following is a specification.

This invention relates to collapsible annular cores of the type wherein a series of segmental sections are so constructed and relatively mounted that they can be collapsed in a manner to facilitate the removal of a tire when it has been built up or formed upon the core, and which sections can then be returned to their original position for a succeeding tire building or forming operation.

The object of my invention is to provide a core of the type described of simple and efficient construction and operation wherein the sections can be collapsed or be returned to annular formation, with facility and dispatch, without resort, in either case, to power-actuated devices.

My invention, generally stated, comprises a plurality of sections whereof two are pivotally supported for swinging movement toward and from each other within the plane of the core, and whereof a third section is slidably supported on a novel frame structure which is, in turn, mounted for swinging movement toward and from such plane, whereby the latter section can be retracted inwardly from the space between the ends of the first-named sections when the several sections are in annular relation, and then can be swung laterally outward to afford an open space into which the thus endfreed pivoted sections can be moved to superpose one of the latter on the other, and whereby, subsequently, all the said sections can be readily positioned in annular relation to complete the core; all of which will be hereinafter described, the scope of the invention being defined in the appended claims.

In the drawings—

Figure 1 is a front elevation of a collapsible tire core embodying my invention, showing the sections in annular relation, and indicating in dotted lines the position of the key section when it is retracted within the plane of the core.

Fig. 2 is a vertical section through the structure, on the line 2—2 of Fig. 1, indicating in dotted lines the key section as retracted and also as swung outward.

Figure 3:
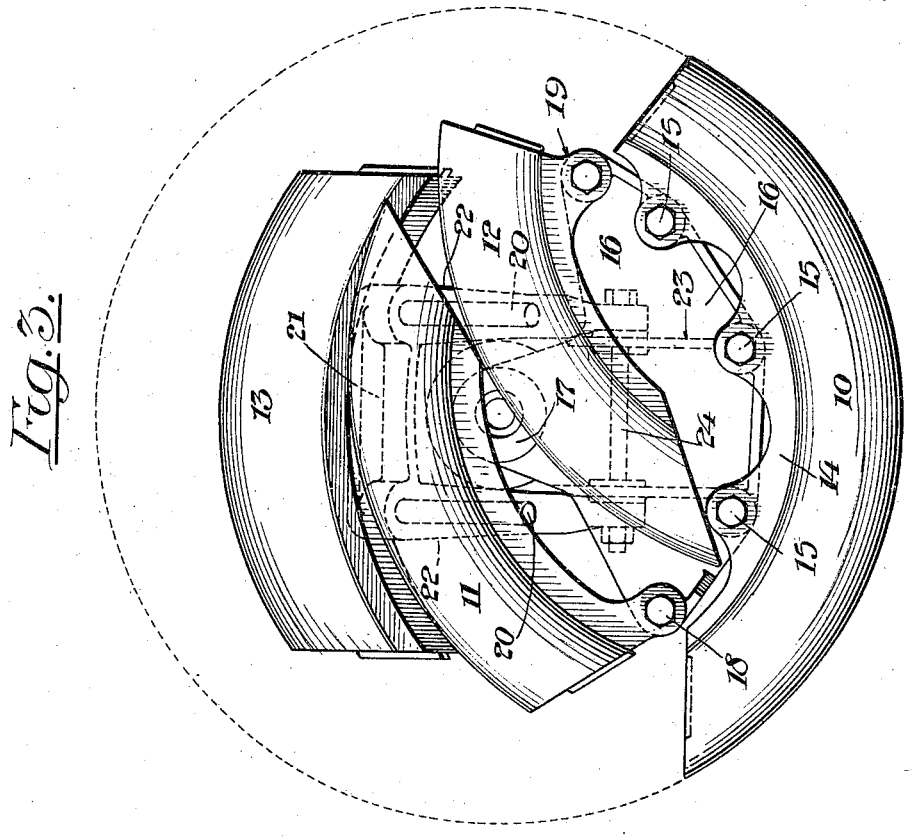
Fig. 3 is a front elevation showing the key section as retracted and swung outward, and the hinged side sections swung inward one upon the other.
Figure 4:
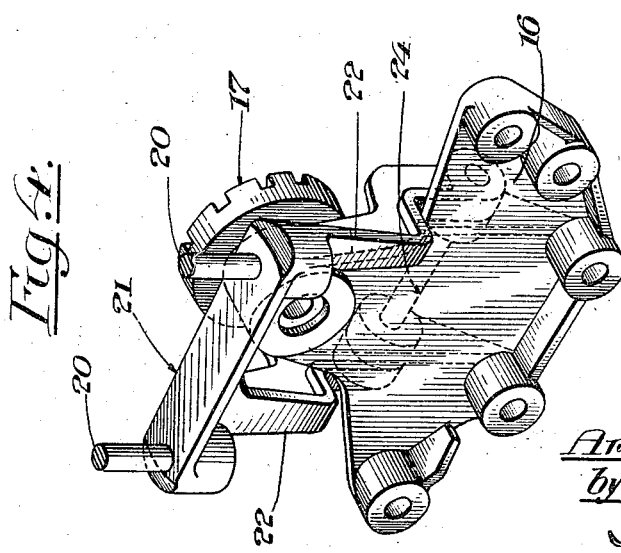
Fig. 4 is a perspective view of the supporting bracket and the swinging frame thereon for the guide rods of the key-section.

Referring to the drawings, 10, 11, 12 and 13 designate a series of relatively movable segmental sections which can be readily assembled and positioned to constitute a complete annular core upon which a tire can be built or formed, and which sections can be as readily collapsed or "broken" to facilitate the effective removal of the tire therefrom.

The section 10, which constitutes the base section, is provided with an internal web 14 that is bolted, as at 15, to the outer portion of a supporting bracket 16 having a hub 17 laterally of and in axial alinement with the core. This hub is adapted to be mounted on the end of a suitable supporting shaft. The sections 11 and 12, which constitute opposite side sections, are provided with internal ribs having suitably-disposed lugs 18, 19 which are permanently pivoted to the respective ends of the bracket, so that said sections can be swung on their axes toward and from the interior of the core. These lugs may, if desired, be pivotally attached to lugs formed on the respective ends of the section 10. The extremities of the three sections 10, 11 and 12, adjacent the pivots, are so formed that when the sections 11, 12 are in their normal or outer position such extremities abut squarely against each other, and the peripheries of three sections 10, 11 and 12 are in circular relation to each other, with the free ends of the sections 11, 12 spaced apart, as seen in Fig. 1. The pivotal point of the section 12 is in a plane above that of the section 11 for a purpose below explained.

The section 13 constitutes a key section which is so constructed and so mounted in respect to the sections 11, 12 that it can be bodily moved into and from the space between the free ends of the latter. This key section has affixed thereto two inwardly-extending parallel guide rods 20 that are slidably fitted to spaced bearing apertures in the body or cross-member 21 of a bifurcated frame. The arms 22 of this frame are shaped to embrace the bracket hub and to depend below the same on the outer side of the bracket, the lower portions of the arms being hingedly connected to vertical ribs 23 on the bracket by means of a pivot bolt 24.

By the foregoing described construction it will be seen that when the frame 21, 22 is in its normal or inward position with its upper or guide portion within the plane of the core, the key section, by virtue of its guide rod connection with such portion, can be moved from or into the space between the free ends of the sections 11, 12, and that when the key section is retracted from the space between said sections the said frame can be swung outward on its pivot in a manner to carry the key section laterally beyond the plane of the core, as indicated by the dotted lines in Fig. 2.

It will also be seen that when all the sections are disposed in annular relation to each other they constitute an annular core upon which the tire may be built up or supported in the usual manner, and that when the tire has been fabricated on the core, the section 13 can be retracted from the tire and toward the center of the core, and then can be swung bodily from the plane of the core by the outward swinging motion of the frame. Then by virtue of the different levels of the pivots 18, 19 the sections 11, 12 can be swung inwardly to a position with one section superimposed on the other and with their hinged ends entirely clear of the tire. (See Fig. 3). Thus the sections 11, 12, 13 are free of the tire and consequently the tire can be readily removed from the remaining or base section 10.

After the tire has been removed from the core, the sections 11, 12 are swung to their outward positions and the frame 21, 22 is swung inward to locate the section 13 in the plane of the core. The sections are then turned on the central axis of the core to position below the center the section 13 and permit it to drop into place, by gravity, between the sections 11, 12, thus completing the annular formation of the core preparatory to the building of another tire thereon; and so on.

By the described pivotal arrangement of the bifurcated frame and the slidable mounting of the key section thereon, said section can be quickly withdrawn entirely from the tire and then swung laterally therefrom, and by the described relative pivotal arrangement of the sections 11, 12 both said sections can also be swung entirely clear of the tire without necessitating the detachment of either of the sections from its pivotal support. My invention thus provides a unitary self-contained structure whereof the various members can be easily and quickly manipulated without extraneous operating mechanism, either to collapse the core or to position the sections thereof in annular relation.

If the core above described be used in connection with a vulcanizing mold, the sections will be arranged in annular relation to each other before applying the raw tire to the core. When the vulcanized tire, with the encased core is removed from the mold, the withdrawal of the tire from the core can be readily effected by collapsing the core in the manner previously mentioned.

I claim—

1. A collapsible core comprising a base section, a support therefor, two side sections hingedly mounted adjacent the respective ends of the base section for movement into and from the interior of the core, a key section movable into and from the normal space between the free ends of the side sections, an element hingedly mounted on said support for movement laterally thereof into and from the plane of the core, and a sliding connection between the key section and the said element.

2. A collapsible core comprising a base section, a support therefor, two side sections hingedly mounted adjacent the respective ends of the base section, the axes of the two sections being relatively located to permit one section to be folded upon and longitudinally of the other section, a key section movable into and from the normal space between the free ends of the side sections, an element hingedly mounted on said support for movement laterally thereof into and from the plane of the core, and a sliding connection between the key section and the said element.

3. A collapsible core comprising a base section, a support therefor having a hub axially of the core, two side sections hingedly mounted adjacent the respective ends of the base section for movement into and from the interior of the core, a key section movable into and from the normal space between the free ends of the side sections, a frame loosely embracing the hub and hingedly connected to the exterior of the body of the support, and a sliding connection between the key section and the end of the frame remote from its hinged connection.

4. A collapsible core comprising a base section, a support therefor having a hub axially of the core, two side sections hingedly mounted on said support adjacent the respective ends of the base section, the axes of the two sections being relatively located to permit one section to be folded upon and longitudinally of the other section, a key section movable into and from the normal space between the free ends of the side sections, a bifurcated frame whereof the arms loosely embrace the hub and depend therefrom, a pivotal connection between the lower ends of the said arms and the support, and guide rods extending inwardly from the key section and slidably fitted to the body of the frame.

Signed at Akron, in the county of Summit and State of Ohio, this 22nd day of Nov. A. D. 1922.

ARCHER H. HARRIS.